United States Patent Office 3,480,139
Patented Nov. 25, 1969

3,480,139
RECOVERY OF KIESERITE FROM CRUDE MINERAL SALTS
Guenter Fricke, Roeddensen, Lehrte, and Arno Singewald, Kassel, Wilhelmshohe, Germany, assignors to Wintershall Aktiengesellschaft, Kassel, Germany
No Drawing. Filed July 5, 1967, Ser. No. 651,653
Claims priority, application Germany, Feb. 2, 1967, W 43,285
Int. Cl. B03b 1/04
U.S. Cl. 209—9  15 Claims

ABSTRACT OF THE DISCLOSURE

Kieserite is obtained in a preparation process of mineral salts comprising the step of adding a finely dispersed water adsorbent and a chemical conditioning agent to the crude salt, the adsorbent and the chemical agent being in physically separate form, and the chemical conditioning agent comprising at least one fatty acid having between 3 and 18 carbon atoms, subjecting the components to thorough mixing and thereafter effecting the separation in an electrostatic step at a relative humidity between 0.5 and 20%.

Cross-reference to related application

Application Ser. No. 651,652 filed concurrently herewith of the same inventors for preparation of mineral mixtures, particularly salt minerals and salt aggregates.

Background of the invention

Kieserite has assumed increasing industrial significance as a type of slowly water-soluble magnesia for use in fertilizers and as starting product for the manufacture of magnesium compositions that are important technically and in agricultural chemistry.

Kieserite is found in potassium salt deposits associated with sylvite and rock salt, either as the secondary or as the principal mineral. As principal material, kieserite occurs particularly in Hartsalz consisting of sylvite, kieserite and rock salt. In preparing potassium salts, kieserite enters the residue together with the rock salt.

The production of kieserite from residues of the manufacture of potassium salts is therefore a common industrial problem. To separate kieserite from the potassium residues, various processes have been used. Crude kieserite, for instance, was purified by separating the kieserite from its associated materials in a buddling and filtration process.

The kieserite production is also carried out by flotation since the buddling process requires high plant investments. For the flotation, kieserite is made hydrophobic by specific agents and is separated as a foam concentrate. However, the kieserite thus obtained and the residue from the flotaton must be separated from the brine by filtration or centrifuging, at substantial cost, and must then be freed of the remaining water contents by drying.

It has also been proposed (German Patent No. 1,078,-961) to obtain kieserite from crude salts or residues of the potassium salt production by conditioning the mineral with 2,4-dichlorophenoxy acetic acid and then subjecting it to electrostatic separation. For this process, 100–600 g./t. and more specifically 300–600 g./t. of the conditioning agent are necessary, and the agent must be applied in an alcoholic solution. It appears that the separation in that process must be carried out at a temperature above 120° C.

The process requires substantial amounts of the expensive chemical and, in addition, requires high separation temperatures. A further disadvantage is the fact that the presence of this particular chemical agent interferes with and practically inhibits the subsequent electrostatic separation of sylvite. The chemical agent therefore has to be removed prior to the sylvin separation, which may require heating temperatures up to 300° C. At this temperature kieserite starts to become dehydrated and the presence of even a few percent of dehydrated kieserite seriously interferes with the electrostatic separation of the sylvite. This proposal therefore makes it necessary first to effect the separation of the sylvite prior to the final electrostatic separation for recovery of the kieserite.

Summary of the invention

It is therefore an object of the invention to recover kieserite from a mineral salt mixture, particularly a potassium crude salt, without use of expensive chemical conditioning agents.

It is a further object to effect the recovery of the kieserite without the necessity of a preceding separation of the sylvite.

It is a further and broader object of the invention to obtain a good yield at low cost of kieserite by preparation of a potassium crude salt.

These and further objects are met by a process of preparation of a crude mineral salt comprising the step of adding a finely dispersed water adsorbent and a chemical conditioning agent to the crude salt, the adsorbent and the chemical agent being in physically separate form, and the chemical conditioning agent comprising at least one fatty acid having between 3 and 18 carbon atoms, subjecting the components to thorough mixing and thereafter effecting the separation in an electrostatic step at a relative humidity between 0.5 and 20%.

Description of the preferred embodiments

As stated, in order to obtain kieserite from crude salts or residues of crude salt solutions or residues of a flotation operation, finely dispersed adsorbents are mixed with the crude salt together with natural and/or synthetic fatty acids, as more specifically disclosed in the above-mentioned concurrently filed application which is incorporated herein by reference.

In the present case, aliphatic fatty acids that are unbranched and have a chain length of from 3 to 18, preferably a mixture of acids having from 5 to 9 carbon atoms are employed as the chemical conditioning agents. The mixture may contain a certain amount of unsaturated acids but preferably is predominantly saturated. The water adsorbents may, for instance, be silicic acid or soda lime. The mixing may be for one minute to one hour, preferably from 1 to 5 minutes. The sequence of addition of water adsorbents and fatty acids may be exchanged. It is preferred, though, first to add the water adsorbents and subsequently to add the chemical treating agent. The separation proper may be effected in one or several passages.

Once the kieserite is separated from the residue in a preceding electrostatic separation, it is possible to proceed with a secondary separation step without again adding adsorbent or fatty acids. The kieserite separation must, however, be carried out in air having a relative humidity of from 0.5 to 30%, preferably from 3 to 10%.

The following example illustrates the production of kieserite from a potassium crude salt containing 12.6% $K_2O$ and 33.1% kieserite. The process proceeds at a temperature between 40 and 80° C. in a vertical drop (free fall) plate separator. The potassium crude salt was mixed thoroughly for one minute in a Loedige mixer with a finely dispersed silicic acid type water adsorbent and thereafter was sprayed with a mixture of synthetic unbranched, aliphatic fatty acids of a chain length between $C_5$ and $C_9$.

(A commercial product of the Aldag Corp. of Hamburg, Germany was used.)

After one passage, the following results were obtained:

The following Example II illustrates a kieserite production by preparation of a crude salt containing from 11.2–12.2 $K_2O$ and 33.2–34.7% kieserite, at a separation temperature of 60° C. and using a vertical drop separator. The crude salt was treated with 200 g./t. water adsorbent and 180 g./t. of a fatty acid mixture, as in Example I, and in the same sequence.

EXAMPLE I
[Relative Humidity: 4–8%]

| a | | b | | c | |
|---|---|---|---|---|---|
| | | Kieserite Content | | Kieserite Fraction | |
| Water Adsorbent | G./t. | Conc. | Res. | Conc. | Res. |
| Test No.: | | | | | |
| 1 — None | | 32.7 | 38.8 | 28 | 20 |
| 2 — ("Aerosil R 972/u Degussa Corp.) a synthetic silicic acid obtained by a thermal process. | 200 | 60.7 | 7.5 | 72 | 4 |
| 3 — Natural silicic acid ("VN 3", Chemag. Corp.) | 200 | 79.2 | 7.5 | 7.1 | 5 |
| 4 — "Molekularsiebpulver" (Union Carbide Corp.) | 200 | 80.9 | 6.9 | 64 | 6 |
| 5 — Ketjenwhite "Si 200" (Brenntag Corp.) | 200 | 79.8 | 7.5 | 64 | 5 |
| 6 — Silicic acid "KS 404" (Hoesch Corp.) Plus "Molekularsiebpulver" | 100 100 | 64.8 | 7.6 | 57 | 7 |
| 7 — Synthetic silicic acid ("KS 300", Hoesch Corp.) Plus $P_2O_5$ | 100 15 | 60.7 | 8.0 | 57 | 7 |
| 8 — (Kieserite, dehydrated) | 500 | 73.2 | 8.9 | 61 | 7 |

Column a states the type of water adsorbent; column b and column c state the kieserite content in the concentrate and residue. Column c, referring to the kieserite fraction, specifically shows the amount of kieserite after one passage through the electrostatic separator. This figure is therefore not identical with the fiscal yield in a continuous operation.

The kieserite fractions remaining in the middlings which constitute the balance of the 100% are not given, since the middlings are fed back into the starting product in a continuous process.

Tests Nos. 2–8 illustrate the process of the invention. As appears, the preconcentrate percentage of kieserite is higher by between 30 and 50% as against the prior art Test No. 1. The surprising effect of the cumulative and successive use of water adsorbent and fatty acid mixture is thus illustrated. The finely dispersed water adsorbent was added in these cases by thorough mixing and was used in pulverized, gritty or granulated form.

EXAMPLE II
[Relative Humidity: 6%]

| a | b | c | d |
|---|---|---|---|
| Water Adsorbent | Preconc. percent of Kieserite | Sec. Conc. percent of Kieserite | Kieserite Yield, percent |
| Test No.: | | | |
| 9 — None | 32.7 | 72.9 | 28.9 |
| 10 — "Aerosil R 972/u" (Degussa Corp.) | 59.6 | 96.5 | 85.0 |
| 11 — "Molekularsiebpulver" (Union Carbide Corp.) | 77.9 | 94.4 | 87.6 |
| 12 — Silicic acid "KS 300" (Hoesch Corp.) plus "Molekularsiebpulver" | 74.8 | 93.6 | 81.3 |

The secondary concentrate of Tests Nos. 10–12 (process of the invention) shows a kieserite content higher by 20–25% than in the secondary concentrate of the prior art Test No. 9. The kieserite yield is higher by 50–60% than in Test No. 9.

It is noted that the process of the invention does not require a secondary conditioning of the preconcentrate of an electrostatic preparation for the purpose of the secondary separation.

The following example concerns the production of kieserite from a Hartsalz residue obtained from a preceding electrostatic crude salt separation. No addition of water adsorbent or chemical agent was necessary to separate the kieserite. The separation was effected at 70° C. in a vertical drop plate separator.

EXAMPLE III
[Relative Humidity: 4.5%]

| a | b | c | d |
|---|---|---|---|
| Water Adsorbent | Percent of Kieserite in initial product | Percent of Kieserite in conc. | Yield of Kieserite percent |
| Test No.: | | | |
| 13 — "Aerosil R 972/u" (Degussa Corp.) | 52.3 | 97.6 | 89.6 |
| 14 — Filler "VN 3" | 57.6 | 94.7 | 90.3 |
| 15 — "Molekularsiebpulver"+silicic acid "KS 300" (Hoesch Corp.) | 64.8 | 92.6 | 93.3 |
| 16 — Silicic acid "KS 404" (Hoesch Corp.) | 51.8 | 91.9 | 92.0 |

Depending on the humidity condition of the initial mineral and the humidity of the heating air, the separation can be carried out in a temperature range between room temperature and the decomposition or evaporation temperature of the fatty acids.

Example III shows that it is possible to obtain a high kieserite concentrate and a kieserite yield that is practically above 90% in a single separation operation. The particular advantage of the invention in this case is the elimination of the buddling and filtration steps of the wet processes. The process of the invention also permits lower specific amounts of fatty acids, which constitutes a substantial saving as against the use of the chemical agent employed in German Patent No. 1,078,961 discussed above.

A further advantage derives from the lower temperatures which permit a saving in energy input. In case of the kieserite separation, no solvent is necessary for the fatty acids.

A further advantage of the process of the invention is that, after separating the kieserite, the sylvite can be extracted readily with conventional conditioning agents.

As indicated, where the kieserite is obtained from the residue of an electrostatic separation of mineral salts, the process of the invention does not require additional water-adsorbents and chemical conditioning agents for the further separation.

The "Aerosil" product mentioned in Tests 1, 10 and 13 is a synthetic silicic acid obtained at high temperatures from the gaseous phase.

The "Molekularsiebpulver" mentioned in Tests 4, 6, 11 and 15 is a synthetically made metal-alumina silicate having the basic formula $M_{2/n}O \cdot Al_2O_3 \cdot xSiO_2 \cdot yH_2O$.

The "ketjenwhite Si 200" product is a precipitated silicic acid ($SiO_2$).

What is claimed as new and desired to be protected by Letters Patent is set forth in the appended claims:

1. A process for the recovery of a high concentrate of kieserite by preparation of (a) a potassium crude salt or (b) of the residue from a preceding electrostatic crude salt preparation or flotation concentrate consisting of kieserite and rock salt comprising the step of adding a finely dispersed inorganic water adsorbent and a chemical conditioning agent to the crude salt, the adsorbent and the chemical conditioning agent being in physically separate form and the chemical conditioning agent consisting of a mixture of unbranched or branched aliphatic fatty acids having between 3 and 18 carbon atoms; subjecting the components to thorough mixing; and thereafter effecting the separation in an electrostatic step at a relative humidity between 0.5 and 20% and at a temperature of from 40 to 80° C. so as to obtain a kieserite concentrate and a residue.

2. The process of claim 1, wherein the water adsorbent is added prior to the chemical conditioning agent.

3. The process of claim 1, wherein the mixing is effected for 1 to 5 minutes.

4. The process of claim 1, wherein the fatty acids have between 4 and 10 carbon atoms.

5. The process of claim 1, wherein the relative humidity during the separation is between 3 and 10%.

6. The process of claim 1, wherein the fatty acid is employed in an amount between 100 and 300 grams per ton.

7. The process of claim 1, wherein the fatty acid is employed in an amount between 100 and 200 grams per ton.

8. The process of claim 1, wherein the separation is effected at a temperature between room temperature and the evaporation temperature of the chemical conditioning agent.

9. The process of claim 1, wherein the residue obtained in the electrostatic separation is thereafter submitted to a secondary separation treatment without addition of further adsorbents and chemical conditioning agents, the additional separation treatment being effected in air having a relative humidity between 0.5 and 20%.

10. The process of claim 1, wherein the adsorbent is used in pulverulent or granular form.

11. The process of claim 1, wherein the adsorbent is a natural or synthetic silicic acid.

12. The process of claim 1, wherein the adsorbent is a synthetic silicic acid obtained by a thermal process.

13. The process of claim 1, wherein the adsorbent is a metal-alumina silicate.

14. The process of claim 1, wherein the adsorbent is a dehydrated kieserite.

15. The process of claim 1, wherein the adsorbent is a combination of silicic acid and a metal-alumina silicate.

References Cited

UNITED STATES PATENTS 2,180,804  11/1939  Fahrenwald _____ 209—127.1

FOREIGN PATENTS 720,636  5/1942  Germany.
752,155  5/1951  Germany.
1,095,762  9/1960  Germany.

OTHER REFERENCES

Fraas: Tech Publication No. 2257, Aimme, November 1947, pp. 1, 2.

HARRY B. THORNTON, Primary Examiner

R. HALPER, Assistant Examiner

U.S. Cl. X.R.

207—11; 209—127